UNITED STATES PATENT OFFICE.

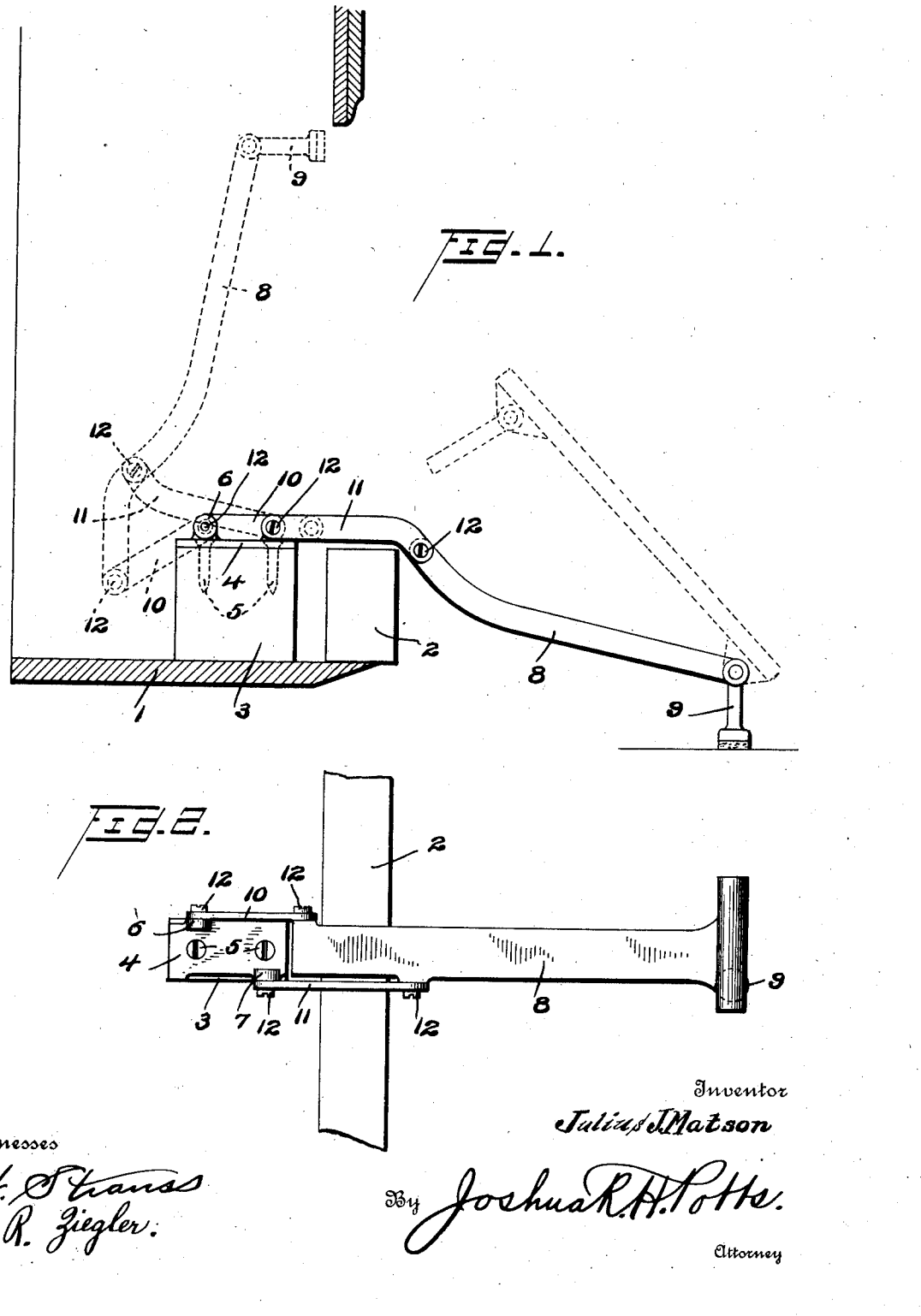

JULIUS J. MATSON, OF GLENWOOD, ILLINOIS.

FOOT-PEDAL.

1,096,551. Specification of Letters Patent. Patented May 12, 1914.

Application filed April 9, 1913. Serial No. 759,910.

*To all whom it may concern:*

Be it known that I, JULIUS J. MATSON, a citizen of the United States, residing at Glenwood, in the county of Cook and State of Illinois, have invented certain new and useful Improvements in Foot-Pedals, of which the following is a specification.

My invention relates to improvements in foot pedals for player pianos and the like, the object of the invention being to provide an improved support for the pedal which allows the same to be readily folded through the open panel of the piano when not in use.

A further object is to provide a pedal support of this character which is of extremely simple construction, neat and attractive in appearance, and strong and durable in use.

With these and other objects in view, the invention consists in certain novel features of construction and combinations and arrangements of parts as will be more fully hereinafter described and pointed out in the claims.

In the accompanying drawings: Figure 1 is a fragmentary view in vertical section illustrating in full lines my improved pedal support in operative position, and in dotted lines in folded position. Fig. 2 is a fragmentary plan view of Fig. 1.

1 represents the bottom of the piano having an open panel 2 at the front and 3 is a block fixed to the bottom 1. On the block 3, a metal plate 4 is secured by screws 3, and this plate is provided at one side near its inner end with an eye 6, and on its opposite side near its outer end with an eye 7.

8 represents my improved pedal support which has a pivoted foot 9 at its free end, said support when in use, pivotally supporting the forward end of the pedal proper which is pivotally secured to the front end of said support in a manner readily understood by those skilled in the art. Said support 8, at its inner end, at one side is connected by a link 10 with the eye 6, and at its other side at a point removed from its inner end is connected by a link 11 with the eye 7. I have illustrated screws 12 as pivotal connecting means between the links and the parts with which they are connected, but the invention is not limited in this particular.

As seen most clearly in Fig. 1, when the pedal support is swung upwardly, it will be carried inwardly by the arrangement of links 10 and 11, so that it will lie inside the plane of the piano. This arrangement of pivotal connection, whereby four pivot points are had, insures the pedal remaining inside of the piano when folded, yet readily moved to operative position when desired.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a base, of a pedal support, and two links pivotally connecting said pedal support with said base, corresponding ends of said links being pivotally connected with said base at points out of transverse alinement, the opposite ends of said links being pivotally connected with said pedal supports at points also out of transverse alinement, substantially as described.

2. The combination with a base, of a pedal support, a link at one side of said pedal support and base, connecting said pedal support at one end with said base, and a second link at the other side of said support and base, connecting the base with the support at a point removed from the end of the latter, substantially as described.

3. The combination with a base block, of a plate secured on the block and having eyes at its sides located out of transverse alinement with each other, a pedal support, a link connecting one of said eyes with the pedal support adjacent its end, and a second link connecting the other of said eyes with the pedal support at a point removed from its ends, substantially as described.

4. The combination with a piano having an open panel therein, of a block secured in the piano, a plate secured on the block, and having eyes at its sides, one of said eyes located adjacent the inner end of the plate, and the other of said eyes adjacent the outer end of the plate, a pedal support located in line with the block, a link at one side of the plate and the pedal support connecting the innermost eye with one side of the pedal support at the inner end of the latter, and a second link located beside the plate and the pedal support and connecting the other of said eyes with the pedal support at a point removed from its end, substantially as described.

In testimony whereof I have signed my name to this specification in the presence of two subscribing witnesses.

JULIUS J. MATSON.

Witnesses:
ARTHUR A. OLSON,
JOSHUA R. H. POTTS.

Copies of this patent may be obtained for five cents each, by addressing the "Commissioner of Patents, Washington, D. C."